United States Patent Office 3,497,546
Patented Feb. 24, 1970

3,497,546
METHOD FOR PREPARING MALONONITRILE
Philip L. Levins, Lexington, Dennis E. Johnson, Cambridge, and Wilmer L. Kranich, Worcester, Mass., assignors to Arthur D. Little, Inc., Cambridge, Mass., a corporation of Massachusetts
No Drawing. Filed Nov. 28, 1966, Ser. No. 597,199
Int. Cl. C07c 121/22, 121/02
U.S. Cl. 260—465.8                              1 Claim

ABSTRACT OF THE DISCLOSURE

A method for synthesizing malononitrile by reacting cyanogen with acetonitrile.

---

This invention relates to the preparation of malononitrile.

Malononitrile, $CH_2(CN)_2$, is used primarily as an intermediate in the preparation of a number of organic compounds, and in particular in the synthesis of drugs and pharmaceuticals such as barbiturates, and in riot control gases of the benzaldehyde type.

By the method of this invention, acetonitrile and cyanogen are reacted at elevated temperatures to form the desired malononitrile and by-product HCN.

In the prior art, malononitrile has been made by reacting acetonitrile with hydrogen cyanide (U.S.P. 3,055,738). This method gives rise to a variety of products and unfortunately a low yield of malononitrile.

It would therefore be desirable to have a method for making malononitrile which was economical, required the fewest number of steps and used readily available starting materials. It is therefore the primary object of this invention to provide an improved method for synthesizing malononitrile, the method fulfilling these desiderata.

The invention accordingly comprises the several steps and the relation of one or more of such steps with respect to each of the others thereof, which will be exemplified in the method hereinafter disclosed, and the scope of the invention will be indicated in the claims.

We have discovered a new chemical route for synthesizing malononitrile using acetonitrile and cyanogen according to the following reaction $$CH_3CN + (CN)_2 \rightarrow HCN + CH_2(CN)_2$$

The reaction is carried out in the gaseous phase in a quartz reactor tube at a temperature between about 950° C. and 1050° C. using a flow time within the tube between about 0.2 and 2 seconds. Although superatmospheric pressures may be used, atmospheric pressure is satisfactory.

The ratio of reactants is not critical; but it is preferable to use an excess of cyanogen such that the ratio of cyanogen to acetonitrile ranges from 1 to 1 to 3 to 1 on a molar basis.

The method of this invention is further described with reference to the following examples which are meant to be illustrative and not limiting.

Gas streams of cyanogen and acetonitrile were introduced into a quartz reactor tube having an effective volume of 26 cc. The temperatures, flow times, reactant ratios and product yields are given in the tabulation below.

The product gas stream was directed into a series of Pyrex traps maintained at 0° C. The trapped fractions were combined and the concentration of malononitrile in the resultant acetonitrile solution was determined by nuclear magnetic resonance spectroscopy.

It will be apparent from the examples that relatively high yields are obtained by this new reaction. The by-products formed in the synthesis as a result of any side reactions are minimal and readily separated from the product malononitrile.

| Ex. No. | Temp. (° C.) | Flow time (sec.) | Reactant ratio $CH_3CN$ | Reactant ratio $(CN)_2$ | Percent conv. $CH_3CN$ | $CH_2(CN)_2$ | HCN | $(CH_2CN)_2$ | $(CHCN)_2$ | $CH=CHCN$ |
|---|---|---|---|---|---|---|---|---|---|---|
| 1 | 1,010 | 0.2 | 1 | 3 | 6 | 16 | 21 | [1]3 | [1]3 | [1]3 |
| 2 | 980 | 0.3 | 1 | 3 | 12 | 23 | 23 | [1]3 | [1]6 | [1]2 |
| 3 | 980 | 1.3 | 1 | 2 | 35 | 22 | [2]160 | Trace | 30 | 12 |

[1] Approximate values.
[2] Based on $H_2$ release from analyzed products would expect 178%.

It will thus be seen that the objects set forth above, among those made apparent from the preceding description are efficiently attained and, since certain changes may be made in carrying out the above method without departing from the scope of the invention, it is intended that all matter contained in the above description shall be interpreted as illustrative and not in a limiting sense.

We claim:
1. A method for synthesizing malononitrile comprising reacting cyanogen and acetonitrile at a temperature between about 950 and 1050° C. in a reactor tube, the residence time of the reactants in the tube being from about 0.2 to 2 seconds and the molar ratio of said cyanogen to said acetonitrile in the reaction mixture ranging from 1 to 1 to 3 to 1.

References Cited

UNITED STATES PATENTS

| | | | |
|---|---|---|---|
| 2,802,020 | 8/1957 | Fierce et al. | 260—465.3 |
| 2,915,548 | 12/1959 | Andres | 260—465.3 |
| 3,057,906 | 10/1962 | Fierce et al. | 260—465.3 |
| 3,055,738 | 9/1962 | Krebaum | 260—465.8 XR |
| 3,116,318 | 12/1963 | Fierce et al. | 260—466.8 XR |

JOSEPH P. BRUST, Primary Examiner

U.S. Cl. X.R.

23—151; 260—465.9